(12) United States Patent
Vaughn

(10) Patent No.: US 11,317,615 B2
(45) Date of Patent: May 3, 2022

(54) REPLACEMENT FISHING LINE CARTRIDGE AND METHOD OF REPLACING FISHING LINE

(71) Applicant: Eric R. Vaughn, Plattsmouth, NE (US)

(72) Inventor: Eric R. Vaughn, Plattsmouth, NE (US)

( * ) Notice: Subject to any disclaimer, the term of this patent is extended or adjusted under 35 U.S.C. 154(b) by 419 days.

(21) Appl. No.: 16/518,653

(22) Filed: Jul. 22, 2019

(65) Prior Publication Data
US 2020/0022348 A1 Jan. 23, 2020

Related U.S. Application Data

(60) Provisional application No. 62/701,270, filed on Jul. 20, 2018.

(51) Int. Cl.
*A01K 89/01* (2006.01)
*A01K 89/015* (2006.01)

(52) U.S. Cl.
CPC .............................. *A01K 89/01931* (2015.05)

(58) Field of Classification Search
CPC .............. A01K 89/003; A01K 89/0111; A01K 89/01931
See application file for complete search history.

(56) References Cited

U.S. PATENT DOCUMENTS

| | | | | |
|---|---|---|---|---|
| 3,026,059 A | * | 3/1962 | Dennler | A01K 89/003 242/593 |
| 4,007,886 A | * | 2/1977 | Kaminstein | A01K 89/003 242/486.8 |
| 4,540,136 A | * | 9/1985 | Rauch | A01K 89/003 242/150 R |
| 4,720,056 A | * | 1/1988 | Danielsson | A01K 89/016 242/303 |
| 4,795,107 A | * | 1/1989 | Williams | A01K 89/003 242/321 |
| 5,161,751 A | * | 11/1992 | Bolcavage | A01K 89/0111 242/322 |

(Continued)

OTHER PUBLICATIONS

Washingtonflyfishing.com.
How to Remove Old Fishing Line From Reel (You Tube).

*Primary Examiner* — Emmanuel M Marcelo
(74) *Attorney, Agent, or Firm* — Luke C. Holst; McGrath North Mullin & Kratz, PC LLO

(57) ABSTRACT

The present invention relates in general to the field of rod-and-reel fishing, and more specifically, to a cartridge for holding new fishing line while at the same time providing a convenient storage mechanism for retrieving, holding and disposing of old, worn-out fishing line. One aspect of the replacement fishing line cartridge includes an outer spooling portion and an inner spooling portion. The inner spooling portion may be detachably snapped, slid or locked into the outer spooling portion. The outer spooling portion may be configured to hold new fishing line. The inner spooling portion may be configured to hold old fishing line, wherein the inner spooling portion fits inside the outer spooling portion to prevent the old fishing line from detangling. In this manner, the replacement fishing line cartridge may be used to conveniently dispose of and/or recycle old fishing line in a compact manner. The purpose of the invention is to provide a replacement fishing line cartridge and method of replacing fishing line that is convenient, disposable and environmentally friendly.

18 Claims, 9 Drawing Sheets

(56) References Cited

U.S. PATENT DOCUMENTS

| | | | | |
|---|---|---|---|---|
| 5,322,236 | A * | 6/1994 | Smith | A01K 89/003 |
| | | | | 118/420 |
| 5,709,350 | A * | 1/1998 | Davis | B65H 54/106 |
| | | | | 242/390.8 |
| 6,102,319 | A * | 8/2000 | Annabel | A01K 89/003 |
| | | | | 242/125.1 |
| 6,648,262 | B1 * | 11/2003 | Huffman | A01K 89/003 |
| | | | | 242/390.8 |
| 8,919,690 | B1 * | 12/2014 | Fromm | B65H 75/148 |
| | | | | 242/601 |
| 9,480,246 | B1 * | 11/2016 | Carlebach | A01K 89/0113 |
| 2008/0023580 | A1 * | 1/2008 | Steeber | B65H 75/28 |
| | | | | 242/390.8 |
| 2009/0179100 | A1 * | 7/2009 | Crofoot | A01K 89/01931 |
| | | | | 242/292 |
| 2012/0205480 | A1 * | 8/2012 | Harnage | B65H 59/04 |
| | | | | 242/422.1 |
| 2014/0263794 | A1 * | 9/2014 | Bruno | A01K 89/003 |
| | | | | 242/323 |
| 2016/0183507 | A1 * | 6/2016 | Morehead | A01K 89/003 |
| | | | | 242/533 |
| 2017/0064933 | A1 * | 3/2017 | Tseng | A01K 89/058 |

* cited by examiner

REPLACEMENT FISHING LINE CARTRIDGE AND METHOD OF REPLACING FISHING LINE

CROSS REFERENCE TO RELATED APPLICATIONS

This application claims priority under 35 U.S.C. § 119 to U.S. Provisional Application Ser. No. 62/701,270 filed Jul. 20, 2018, herein incorporated by reference in its entirety.

FIELD OF THE INVENTION

The present invention relates in general to the field of rod-and-reel fishing, and more specifically, to a cartridge for holding new fishing line while at the same time providing a convenient storage mechanism for retrieving, holding and disposing of old, worn-out fishing line. The purpose of the invention is to provide a replacement fishing line cartridge and method of replacing fishing line that is convenient, disposable and environmentally friendly.

BACKGROUND OF THE INVENTION

Fishing is one of the most popular outdoor activities focused on our natural world. Indeed, more than 49 million Americans took to the waterways to enjoy recreational fishing in 2017. See 2018 Special Report on Fishing, Outdoor Foundation, Recreational Boating & Fishing Foundation (2018), available at https://outdoorindustry.org/wp-content/uploads/2015/03/2018-Special-Report-on-Fishing_FINAL.pdf. One prevalent type of fishing utilizes a rod-and-reel, where the reel holds fishing line so that the line may be cast into and retrieved from water without tangling. Some of the most common types of reels include, but are not limited to, spincast reels, baitcasting reels, spinning reels, surf fishing reels, offshore reels, conventional/trolling reels, fly-fishing reels, and centerpin reels. The top three different types of fishing line include monofilament lines, fluorocarbon lines, and braided lines.

Over time, the fishing line will degrade and become worn-out due to use, exposure to the sun, and general wear and tear. Old fishing line will therefore need to be removed from the reel and replaced with new fishing line to prevent line failure. Depending on the type of fishing line and how often a fisherman partakes in the sport, the fishing line may need to be replaced between 2-3 times a fishing season to once every other season.

Before the fisherman can wind new fishing line onto the reel, however, he/she has to remove the old fishing line, if any. One common removal method may involve unwinding the old fishing line, manually. During the unwinding of the old line, the old line may become tangled, which many fishermen find frustrating and time-consuming to resolve. Moreover, because there is no existing device or method for conveniently storing old fishing line, the old line is often disposed of in a big tangled mess. Most fishing lines are non-biodegradable. Braided fishing lines are non-recyclable and monofilament fishing lines require a special recycling process. Therefore, old fishing lines when improperly disposed cause significant environmental problems. For example old fishing line when thrown in a garbage bin can remain in a landfill for many years. When left in the environment, old fishing line poses serious dangers to wildlife that may eat or become entangled in the line causing injury or death. For these reasons, some fishing groups have spearheaded recycling drop-off locations, programs to educate the public on environmental problems caused by old fishing line, and river/beach/lake clean-up events.

Once the old fishing line is removed from the reel, it must be replaced with new fishing line. New fishing line is typically sold on a spool, which a fisherman may carry in a tackle box while fishing. One consideration when choosing a new fishing line is the particular type and weight of fishing line needed when fishing certain species of fish. Another consideration for the selection of a new fishing line may be the size, weight and volume of the fishing line spool. Yet another consideration when choosing a new fishing line are its ease of use and convenience when winding it on and/or removing it from the reel. A still further and important consideration when choosing a new fishing line is whether its ultimate disposability will be environmentally friendly.

Thus, a desire remains to provide a convenient storage mechanism for retrieving and holding old, worn-out fishing line that is easy to use and environmentally-friendly when disposed. A desire also remains to provide a new fishing line spool that is convenient to use when winding the fishing line on the reel.

BRIEF SUMMARY OF THE INVENTION

Therefore, it is a principal object, feature, and/or advantage of the present disclosure to overcome the aforementioned deficiencies in the art and provide a replacement fishing line cartridge and method of replacing fishing line that holds new fishing line while at the same time provides a convenient storage mechanism for retrieving and holding old, worn-out fishing line.

Another object, feature, and/or advantage of the present disclosure is to provide a replacement fishing line cartridge and method of replacing fishing line that is disposable, environmentally friendly, recyclable and reduces unnecessary waste.

Yet another object, feature, and/or advantage of the present disclosure is to provide a replacement fishing line cartridge and method of replacing fishing line that maximizes efficiency, is easy to operate and convenient to store (e.g., in a tackle box).

A further object, feature, and/or advantage of the present disclosure is to provide a replacement fishing line cartridge and method of replacing fishing line that may be used with all types of fishing reels (e.g., spincast reels, baitcasting reels, spinning reels, surf fishing reels, offshore reels, conventional/trolling reels, fly-fishing reels, or centerpin reels).

A further object, feature, and/or advantage of the present disclosure is to provide a replacement fishing line cartridge and method of replacing fishing line that may be used with all types of fishing lines (e.g., monofilament lines, fluorocarbon lines, or braided lines).

A still further object, feature, and/or advantage of the present disclosure is to provide a replacement fishing line cartridge and method of replacing fishing line that may be used with all types of fishing and fishing techniques.

Yet another object, feature, and/or advantage of the present disclosure is to provide a replacement fishing line cartridge and method of replacing fishing line that may be used with varying lengths, weights and sizes of fishing line.

Another object, feature, and/or advantage of the present disclosure is to provide a replacement fishing line cartridge and method of replacing fishing line that is inexpensive, value-priced and thus affordable for the everyday consumer.

These and/or other objects, features, and/or advantages of the present disclosure will be apparent to those skilled in the art. The present disclosure is not to be limited to or by these objects, features, and advantages. No single aspect need provide each and every object, feature, or advantage.

According to one aspect of the present disclosure, a replacement fishing line cartridge (or fishing line holder) is configured to unwind old fishing line from a reel and apply new fishing line to the reel. The cartridge holds new line in until it is wound onto the reel and holds the old line on the cartridge after removal from the reel.

According to another aspect of the present disclosure, a replacement fishing line cartridge (or fishing line holder) may be configured to hold new line and old line on an outer and/or an inner spooling portion. The inner spooling portion may be detachably snapped, slid or locked into the outer spooling portion. Alternatively, the inner spooling portion may be fixed in place within the outer spooling portion.

According to yet another aspect of the present disclosure, a replacement fishing line cartridge (or fishing line holder) may be configured to hold new line and old line separated by a rigid divider. In this aspect, the cartridge may include a sliding cover to adjustably cover the old fishing line or new fishing line. Alternatively, the cartridge may be configured to hold old fishing line and new fishing line separated by a flexible divider.

A further aspect of the present disclosure includes a method for replacing fishing line using a replacement fishing line cartridge (or fishing line holder). The method includes providing a fishing line cartridge having new fishing line. The method may further include providing a fishing rod and/or reel having old fishing line that requires replacement. The old fishing line may be removed from the fishing reel using the replacement fishing line cartridge. The replacement fishing line cartridge is configured to store the old fishing line and prevent it from detangling. Next the method may include adding the new fishing line to the fishing reel, wherein the new fishing line may be unwound from the replacement fishing line cartridge. After the new fishing line is gone from the replacement fishing line cartridge, the cartridge may be disposed of in its entirety and/or recycled.

Different aspects may meet different objects of the disclosure. Other objectives and advantages of this disclosure will be more apparent in the following detailed description taken in conjunction with the figures. The present disclosure is not to be limited by or to these objects or aspects. It is to be understood that both the foregoing general description and the following detailed description are exemplary and explanatory only and are not necessarily restrictive of the present disclosure. The accompanying figures, which are incorporated in and constitute a part of the specification, illustrate subject matter of the disclosure. Together, the descriptions and the figures serve to explain the principles of the disclosure.

DESCRIPTION OF FIGURES

FIGS. 1A through 6D represent examples of replacement fishing line cartridges of the present disclosure, and a method of replacing fishing line using the replacement fishing line cartridge.

FIG. 1A is an isometric front-side view of a replacement fishing line cartridge with a snap-out inner spooling portion inside an outer spooling portion, wherein the replacement fishing line cartridge is in a closed position. A drive bit is stored in a storage slot.

FIG. 4 is an isometric top-side view of a replacement fishing line cartridge with a rigid divider.

FIG. 6D is an isometric rear-side view of the inner spooling portion of FIG. 6C in the open position showing the lock-in element.

DETAILED DESCRIPTION OF THE INVENTION

Figure 1A:
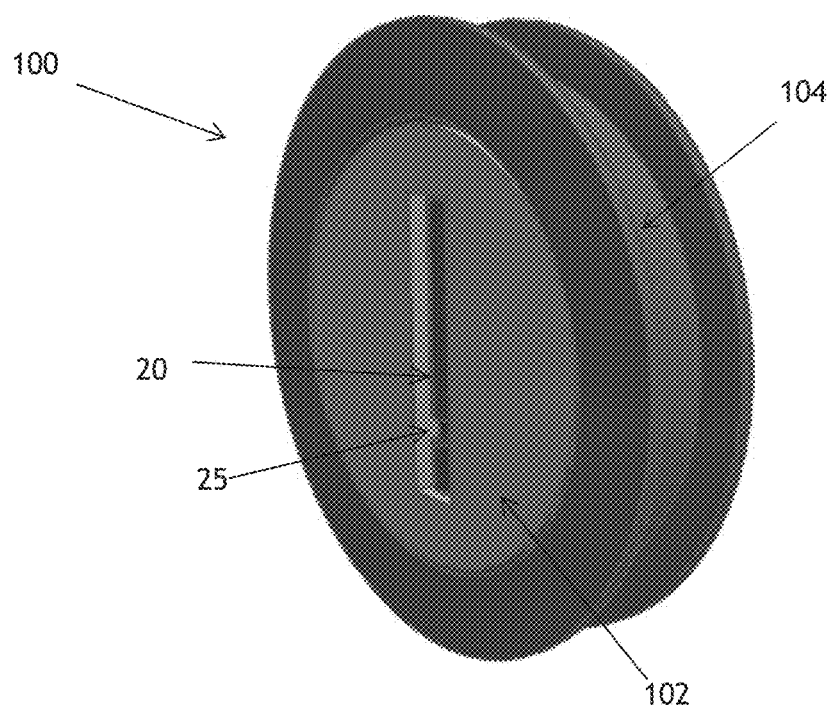

Referring generally to FIGS. 1A through 6D, the present disclosure is directed to a replacement fishing line cartridge (or fishing line holder) and a method of replacing fishing line configured to assist with unwinding old fishing line from a fishing reel, storing the old fishing line, and adding new fishing line to the reel.

In one aspect of the present disclosure, the replacement fishing line cartridge may have a first spooling portion and a second spooling portion. The first and/or second spooling portion may be configured to hold the old fishing line or the new fishing line.

In another aspect, the first and/or second spooling portion may comprise a suitable geometry for holding the fishing line in a wound configuration. For example, the suitable geometry may comprise, but is not limited to: a cylinder with an outer radius fixed along the length of the cylinder; a truncated cone with an outer radius that varies according to position from the cones truncated face; a regular polygon shape; or any other suitable shape for holding fishing line in a wound configuration. The cylindrical geometry may be either a right or oblique cylinder. The cylindrical geometry may be an hourglass shape, with the middle of the cylinder having a smaller outer radius than either of the edges of the cylinder.

In yet another aspect, the first and second spooling portions share a concentric axis. It is contemplated that a concentric axis will facilitate with production of the line holder and with the winding and unwinding of old and/or new fishing line. The suitable geometry of the first and/or second spooling portions may have identical inner radii, similar inner radii, or inner radii that are dissimilar.

In a further aspect, the replacement fishing line cartridge may be designed for production via an injection molding process. Considerations for design may include material cost, material thickness, material warping, material sinks, stress concentrations, human assembly time, old/new fishing line winding, and old/new fishing line slippage. The replacement fishing line cartridge may be hollow to decrease weight and material usage. The replacement fishing line cartridge may also include one or more supporting elements, such as, but not limited to, gussets and/or ribs to increase part stiffness, strength and durability. The replacement fishing line cartridge may have a uniform wall thickness, for the purpose of, but not limited to, reducing shrinkages associated with injection molded parts. The replacement fishing line cartridge may be cored to remove extra material and maintain wall thickness. The replacement fishing line cartridge may further include mounting features, such as, but not limited to, bosses. The replacement fishing line cartridge may have a suitable draft offset angle known in the art to facilitate removal of parts from an injection mold. The replacement fishing line cartridge may have rounded corners, suitable for reducing stress concentrations. The replacement fishing line cartridge may have a uniform wall thickness, minimized to reduce plastic material cost while maintaining suitable part strength. The replacement fishing line cartridge may include textual letters; such textual letters may function as any of a logo, instructions, product warning, or any other use suitable for injection molded lettering.

In still another aspect, the replacement fishing line cartridge may incorporate a fastening device for attaching (removably or permanently) the first and second spooling portions together, such as, but not limited to: screws; interlocking parts; rivets; snap fits; plastic welding; ultrasonic welding; thermal welding; adhesives; glues; epoxies; tape; elastomer bands; retainer tabs; clips; zip ties; or interference fits. Alternatively, the first and second spooling portions may be integrally formed together during the manufacturing process.

In a further aspect, the replacement fishing line cartridge may include spooling portions with a different outer radius and a different inner radius. Furthermore, the spooling portions may have no lateral offset. It is contemplated that in such a configuration, the spooling portion with the larger outer radius may be called an outer spooling portion and the spooling with the smaller outer radius may be called an inner spooling portion, where the outer spooling portion surrounds the inner spooling portion. The replacement fishing line cartridge may be stored in a closed position, where the inner spooling portion may not be accessed for winding and unwinding. Alternatively, the replacement fishing line cartridge may be in an open position, where the inner spooling portion may be accessed for winding and unwinding fishing line. The inner and outer spooling portions may function as either a first spooling portion or a second spooling portion. Additionally, the first and/or second spooling portions of the replacement fishing line cartridge may comprise suitable geometry configured to optimally hold fishing line.

FIGS. 1A-D illustrate one aspect of the replacement fishing line cartridge 100 comprising an inner spooling portion 102 and an outer spooling portion 104. The inner spooling portion 102 may be configured to detachably snap in-and-out of an inner radius of the outer spooling portion 104. The inner spooling portion 102 may be configured for snapping in-and-out of the outer spooling portion 104 by a fastening device, such as, but not limited to, an interference fit, elastomer bands, clips, or retainer tabs. The inner spooling portion 102 and outer spooling portion 104 may be configured to hold either the old fishing line or the new fishing line, wherein the fishing line is wrapped around its respective spooling portion.

FIG. 1A shows a front view of the replacement fishing line cartridge 100 in a closed position. In the closed position, the inner spooling portion 102 of the replacement fishing line cartridge 100 may be configured to snap/fit tightly inside the inner radius of the outer spooling portion 104. While in the closed position, the inner spooling portion 102 may be configured to hold and store either the old fishing line or the new fishing line, wherein the fishing line is wrapped around the inner spooling portion 102 and enclosed inside the outer spooling portion 104 to prevent detangling of the fishing line.

FIG. 1A further shows a drive bit 20 stored in a storage slot 25 of the inner spooling portion 102. The storage slot 25 may be in a horizontal configuration, where the drive bit 20 is configured to be seated inside the replacement line cartridge 100 for convenience and overall compactability of the replacement fishing line cartridge 100. It is contemplated that the drive bit 20 may comprise a standard hexagonal drive bit shape, or any other drive bit shape, screw head, or other mechanical device that may be used to drive rotation of one or more portions of the replacement fishing line cartridge 100. #The drive bit 20 may also be comprised of, but not limited to, aluminum, steel, injection molded plastics or combinations thereof.

Figure 1B:
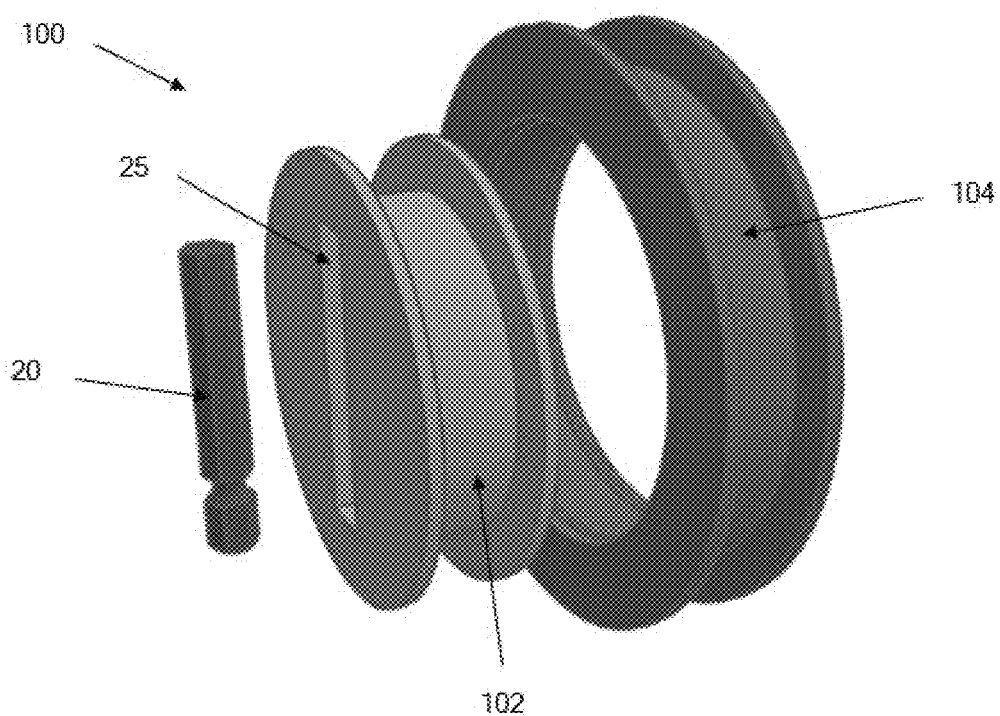
FIG. 1B is an isometric front-side view of the replacement fishing line cartridge of FIG. 1A in an open position, wherein the snap-out inner spooling portion is outside the outer spooling portion. The drive bit is removed from the storage slot.

FIG. 1B shows a front view of the inner spooling portion 102 removed from the outer spooling portion 104 in an open position. FIG. 1B further shows the drive bit 20 removed from the storage slot 25 in preparation for inserting the drive bit 20 into a drive bit hole (not shown) of the inner spooling portion 102.

Figure 1C:
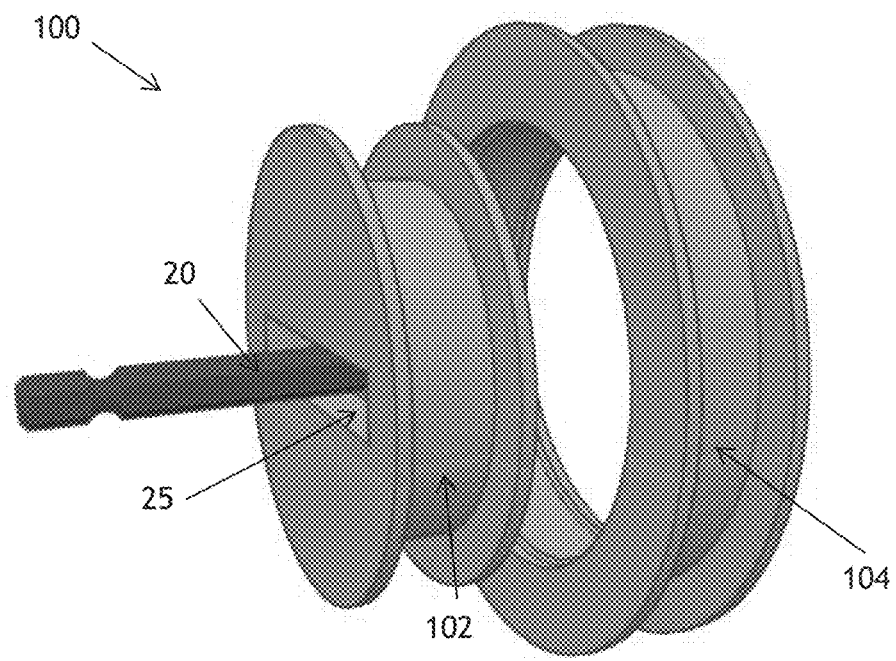
FIG. 1C is an isometric front-side view of the replacement fishing cartridge of FIG. 1B in the open position. The drive bit is inserted into a drive bit hole of the inner spooling portion.

FIG. 1C shows a front view of the drive bit 20 inserted into the drive bit hole (not shown) of the inner spooling portion 102. The drive bit 20 when inserted into the drive bit hole is configured to provide rotational movement to the replacement fishing line cartridge 100. For example, old fishing line may be rotated and wrapped around the inner spooling portion 102 when in the replacement fishing line cartridge 100 is in the open position or around the outer spooling portion 104 when the replacement fishing line cartridge 100 is in the closed position. To provide rotation, the drive bit 20 may be attached to a machine such as, but not limited to, an electric motor or handheld electric drill to allow for machine powered winding and unwinding of the old and/or new fishing lines. Alternatively, the drive bit may be attached to a crank or a handle to provide for manual rotation. It is to be understood that the drive bit 20, drive bit hole, drive bit material, drive bit machine, and storage slot 25 described above are merely illustrative and are not intended to confine the scope of the present disclosure.

Figure 1D:
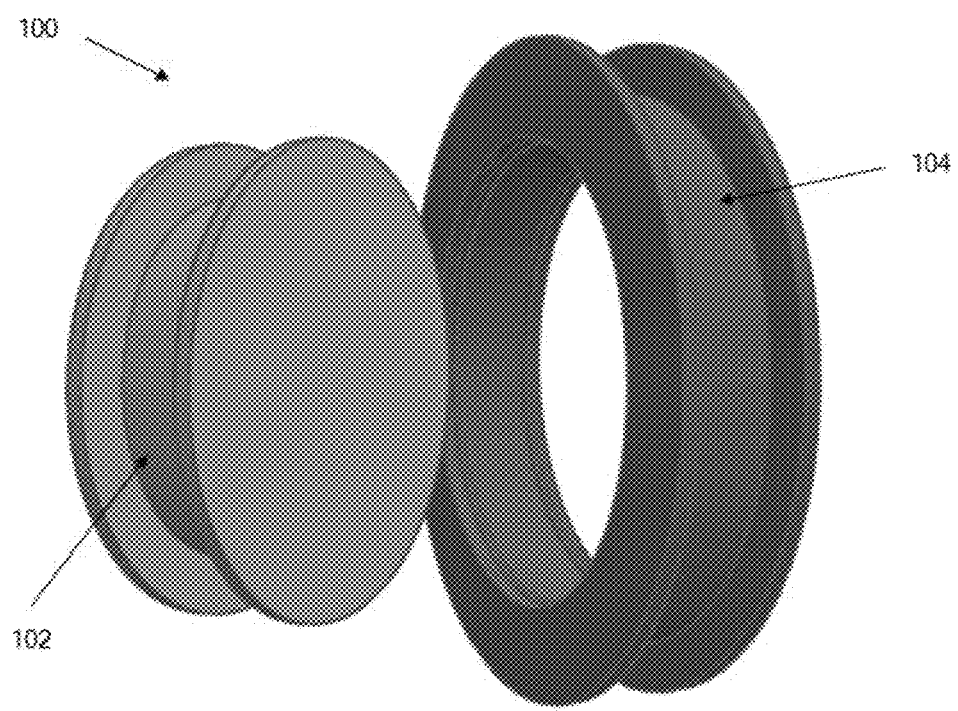
FIG. 1D is an isometric rear-side view of the inner spooling portion of FIG. 1C in the open position.

FIG. 1D shows a rear view of the inner spooling portion 102 removed from the outer spooling portion 104 in the open position.

Figure 2A:
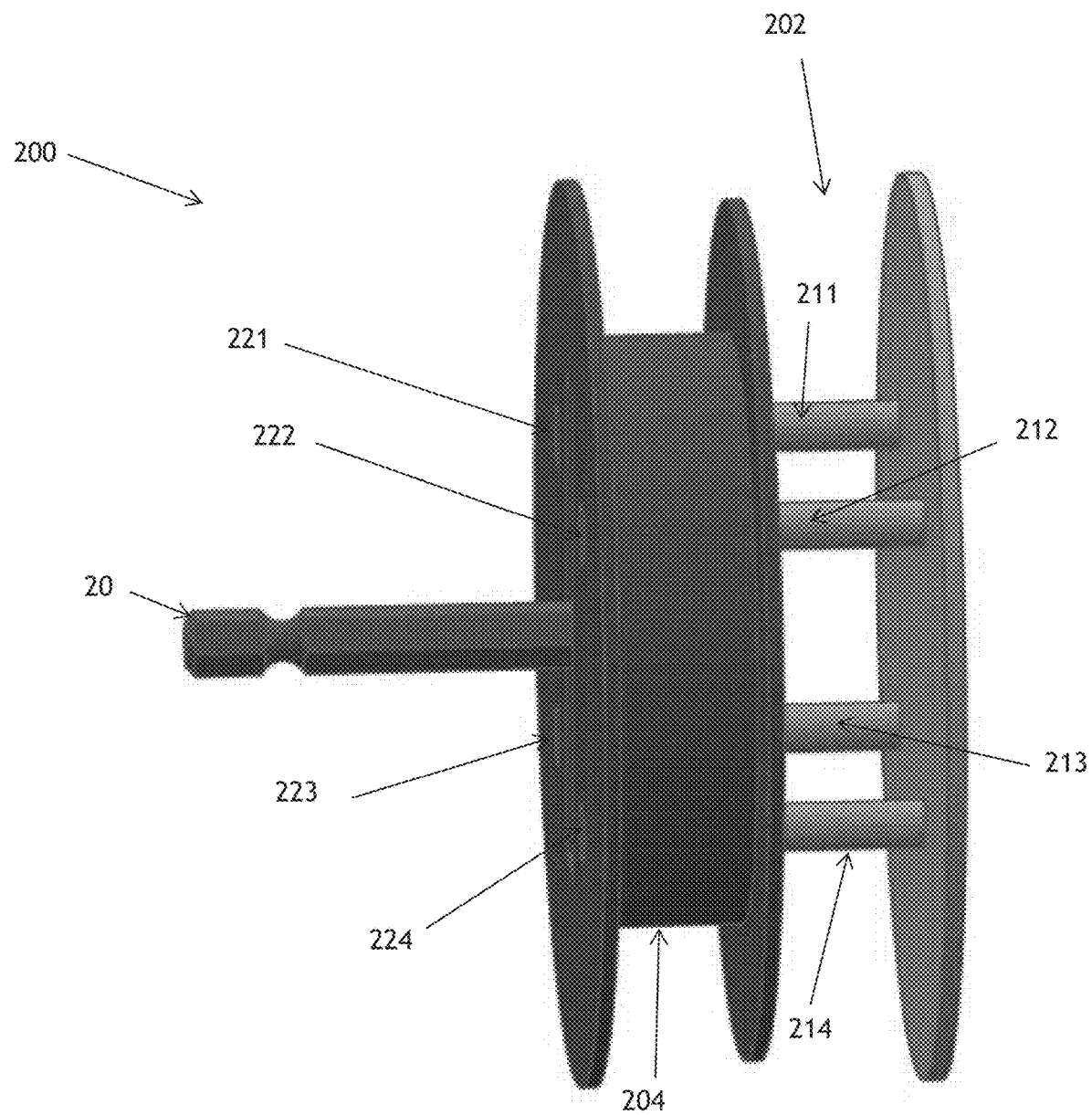
FIG. 2A is an isometric side view of a replacement fishing line cartridge with an inner spooling portion configured to slide out from an outer spooling portion, wherein the replacement fishing line cartridge is in an open position.
Figure 2B:
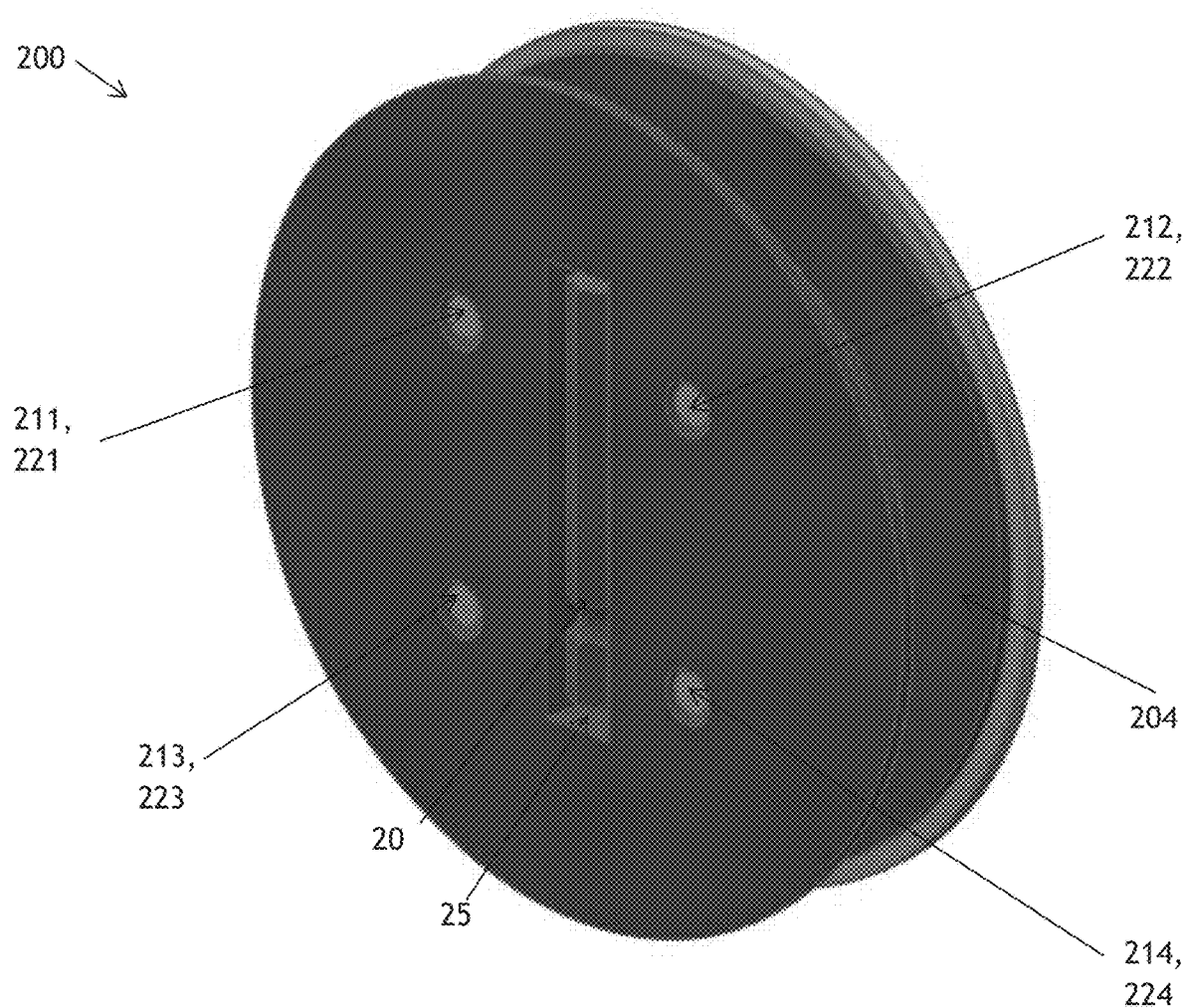
FIG. 2B is an isometric front-side view of the replacement fishing cartridge of FIG. 2A in a closed position.

FIGS. 2A-B illustrate another aspect of the replacement fishing line cartridge 200 comprising a slideout inner spooling portion 202 and an outer spooling portion 204. The inner spooling portion 202 may be configured to detachably slide in-and-out of the outer spooling portion 204. The inner spooling portion 202 may be configured for sliding via an array of tubes 211, 212, 213, 214 that fit into a matching array of holes or cavities 221, 222, 223, 224. The array of tubes 221, 222, 223, 224 may be prevented from sliding completely out of the array of holes 221, 222, 223, 224 by a fastening device such as, but not limited to, screws, rivets, or interference fits.

In particular, FIG. 2A shows the replacement fishing line cartridge 200 in an open position for winding and unwinding the inner spooling portion 202. FIG. 2A further shows the drive bit 20 inserted in the drive bit hole (not shown) and configured to provide rotational movement to the inner spooling portion 202.

FIG. 2B shows the replacement fishing line cartridge 200 in a closed position where the inner spooling portion 202 may not be accessed for winding and unwinding. FIG. 2B further shows the drive bit 20 stored in the storage slot 25.

Figure 3B:
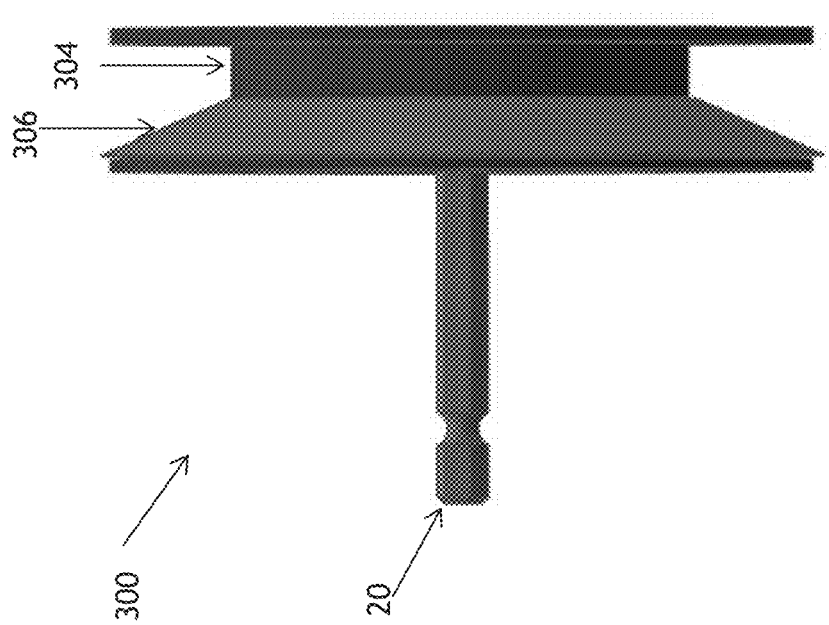
FIGS. 3A-3B are isometric side views of a replacement fishing line cartridge with a flexible divider that is configured to act as a cover.
Figure 3A:
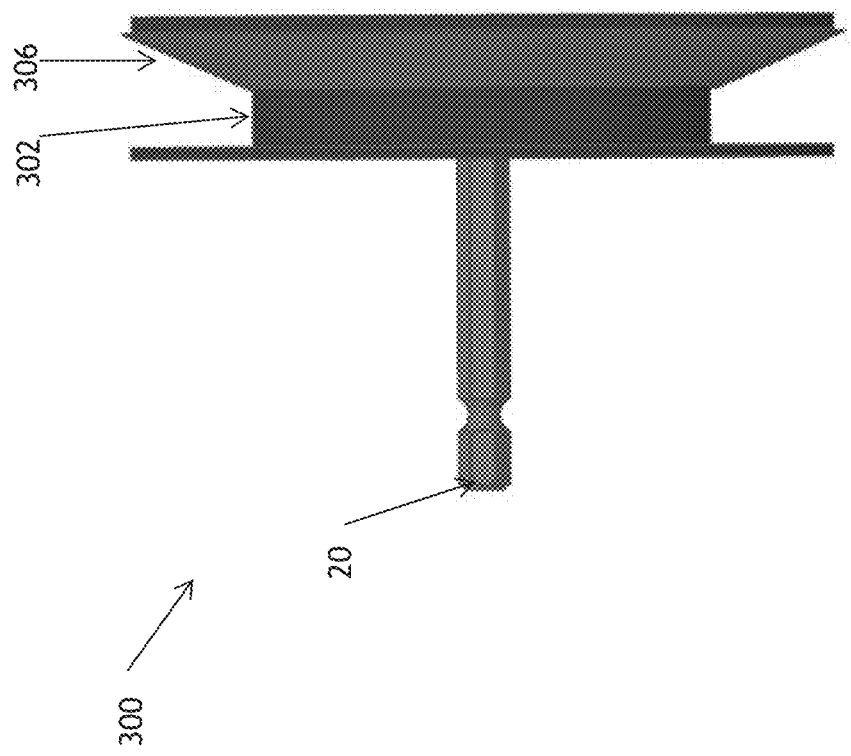

FIGS. 3A-B illustrate another aspect of the replacement fishing line cartridge 300 comprising a flexible divider 306 to adjustably cover either the first spooling portion 302 or the second spooling portion 304. The first spooling portion 302 and the second spooling portion 304 may be laterally offset by the flexible divider 306. The flexible divider 306 may be configured to adjustably cover either the first spooling portion 302 or the second spooling portion 304 during the removal of old fishing line from the reel to the replacement fishing line cartridge 300 and during the winding of the new fishing line from the replacement fishing line cartridge 300 to the reel. The flexible divider 306 may be comprised of suitable elastic material permitting rotation, such as, but not limited to, elastomers. FIG. 3A-B further show the drive bit 20 inserted into the drive bit hole (not shown) of the replacement fishing line cartridge 300. The drive bit 20 when inserted into the drive bit hole is configured to provide rotational movement to the replacement fishing line cartridge 300.

Figure 4:
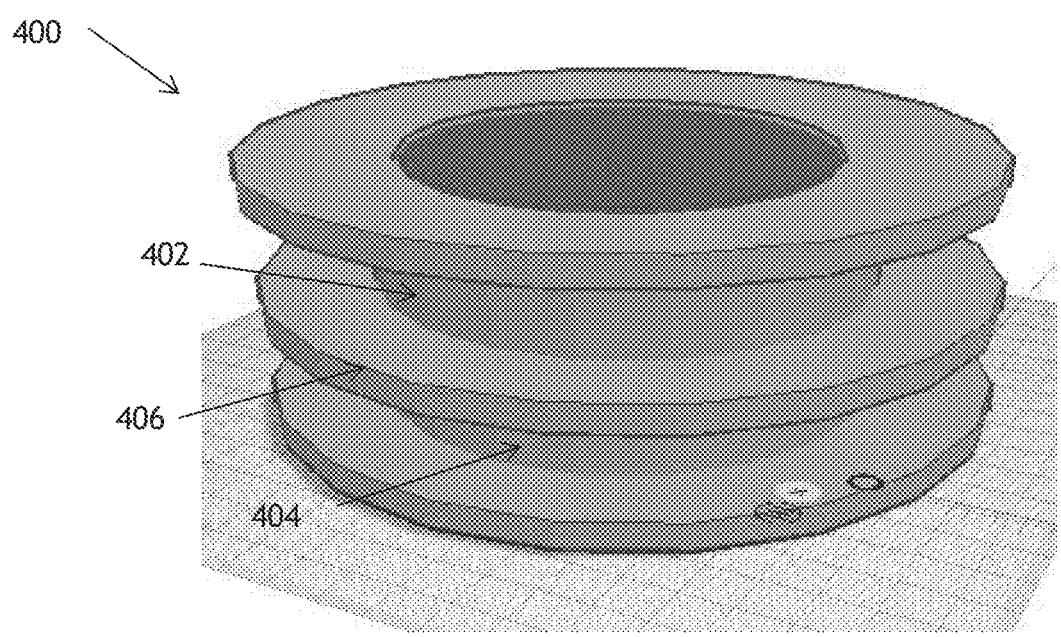

FIG. 4 illustrates another aspect of the replacement fishing line cartridge 400 comprising a rigid divider 406 separating the first spooling portion 402 and the second spooling portion 404. The first spooling portion 402 and the second spooling portion 404 may be laterally offset by the rigid divider 406.

Figure 5A:
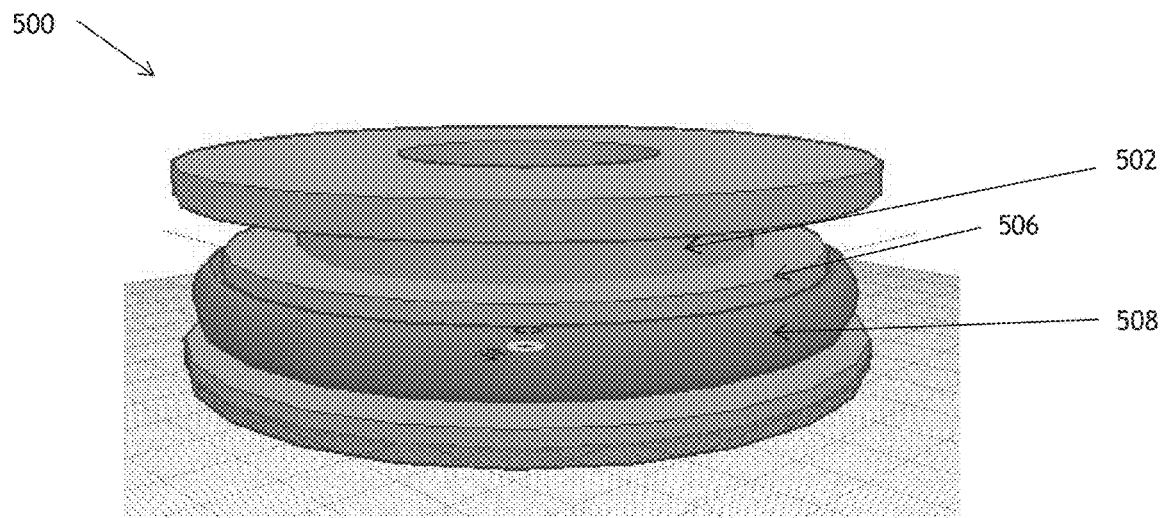
FIGS. 5A-5B are isometric top-side views of a replacement fishing line cartridge with a rigid divider and a sliding cover.
Figure 5B:
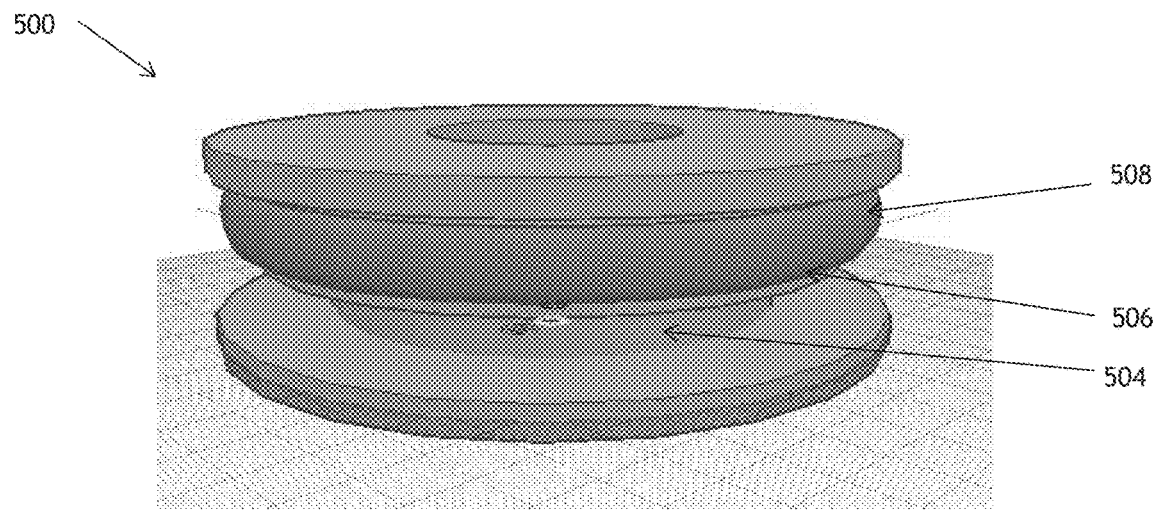

FIGS. 5A-B illustrate another aspect of the replacement fishing line cartridge 500 comprising a rigid divider 506 and a sliding cover 508, where the sliding cover 508 is configured to adjustably cover either the first spooling portion 502 or the second spooling portion 504. The sliding cover 508, as well as a first spooling portion 502 and second spooling portion 504, may be laterally offset by the rigid divider 506. The sliding cover 508 may be configured to cover either the first spooling portion 502 or the second spooling portion 504 during the removal of old fishing line from the reel to the replacement fishing line cartridge 500 and during the winding of the new fishing line from the replacement fishing line cartridge 500 to the reel. The sliding cover 508 may be assembled onto the replacement fishing line cartridge 500 when the first spooling portion 502 and the second spooling portion 504 are fixed by a fastening device.

FIGS. 6A-D illustrate another aspect of the replacement fishing line cartridge 600 comprising an inner spooling portion 602 and an outer spooling portion 604. The inner spooling portion 602 may be configured to detachably lock in-and-out of an inner radius of the outer spooling portion 104. The inner spooling portion 602 may be configured to lock in-and-out of the outer spooling portion 104 using a lock-in element 606. The lock-in element 606 may comprise a female portion 608 on the inner spooling portion 602, and a male portion 610 on the outer spooling portion 604. Alternatively, the female portion 608 may be on the outer spooling portion 604 and the male portion 610 on the inner spooling portion 602. The male portion 610 of the lock-in element 606 may be configured to fit inside the female portion 608, wherein the inner spooling portion 602 may be manually rotated using a gripping portion 612 located on an exterior of the inner spooling portion 602. As the inner spooling portion 602 is rotated the male portion 610 locks into the female portion 608 of the lock-in element 606 to removably attach the inner and outer spooling portions 602, 604 together in a closed position. The inner spooling portion 602 and outer spooling portion 604 may be configured to hold either the old fishing line or the new fishing line, wherein the fishing line is wrapped around its respective spooling portion.

Figure 6A:
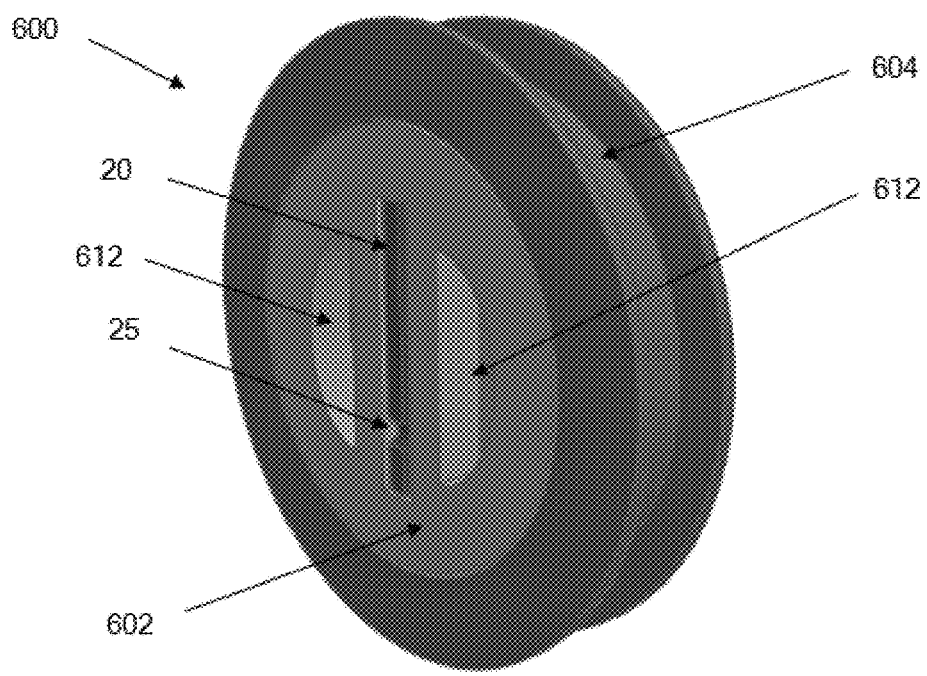
FIG. 6A is an isometric front-side view of a replacement fishing line cartridge with a lock-in inner spooling portion inside an outer spooling portion, wherein the replacement fishing line cartridge is in a closed position. #A drive bit is stored in a storage slot.

FIG. 6A shows a front view of the replacement fishing line cartridge 600 in the closed position. In the closed position, the inner spooling portion 602 of the replacement fishing line cartridge 600 may be configured to lock/fit tightly inside the inner radius of the outer spooling portion 604. While in the closed position, the inner spooling portion 602 may be configured to hold and store either the old fishing line or the new fishing line, wherein the fishing line is wrapped around the inner spooling portion 602 and enclosed inside the outer spooling portion 604 to prevent detangling of the fishing line.

FIG. 6A further shows a drive bit 20 stored in a storage slot 25 of the inner spooling portion 602. The storage slot 25 may be in a horizontal configuration, where the drive bit 20 is configured to be seated inside the replacement line cartridge 600 for convenience and overall compactability of the replacement fishing line cartridge 600. It is contemplated that the drive bit 20 may comprise a standard hexagonal drive bit shape, or any other drive bit shape, screw head, or other mechanical device that may be used to drive rotation of one or more portions of the replacement fishing line cartridge 600. #The drive bit 20 may also be comprised of, but not limited to, aluminum, steel, injection molded plastics or combinations thereof.

Figure 6B:
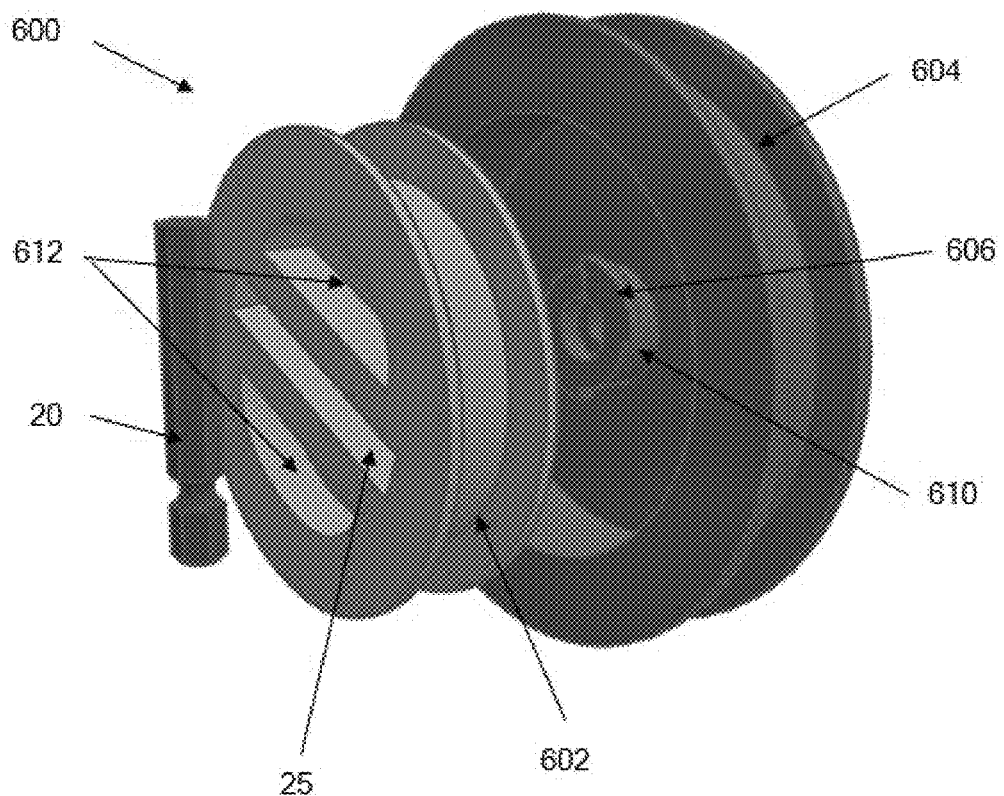
FIG. 6B is an isometric front-side view of the replacement fishing cartridge of FIG. 6A in an open position, wherein the lock-in inner spooling portion is outside the outer spooling portion. The drive bit is removed from the storage slot.

FIG. 6B shows a front view of the inner spooling portion 602 removed from the outer spooling portion 604 in an open position. FIG. 1B further shows the drive bit 20 removed from the storage slot 25 in preparation for inserting the drive bit 20 into a drive bit hole (not shown) of the inner spooling portion 602.

Figure 6C:
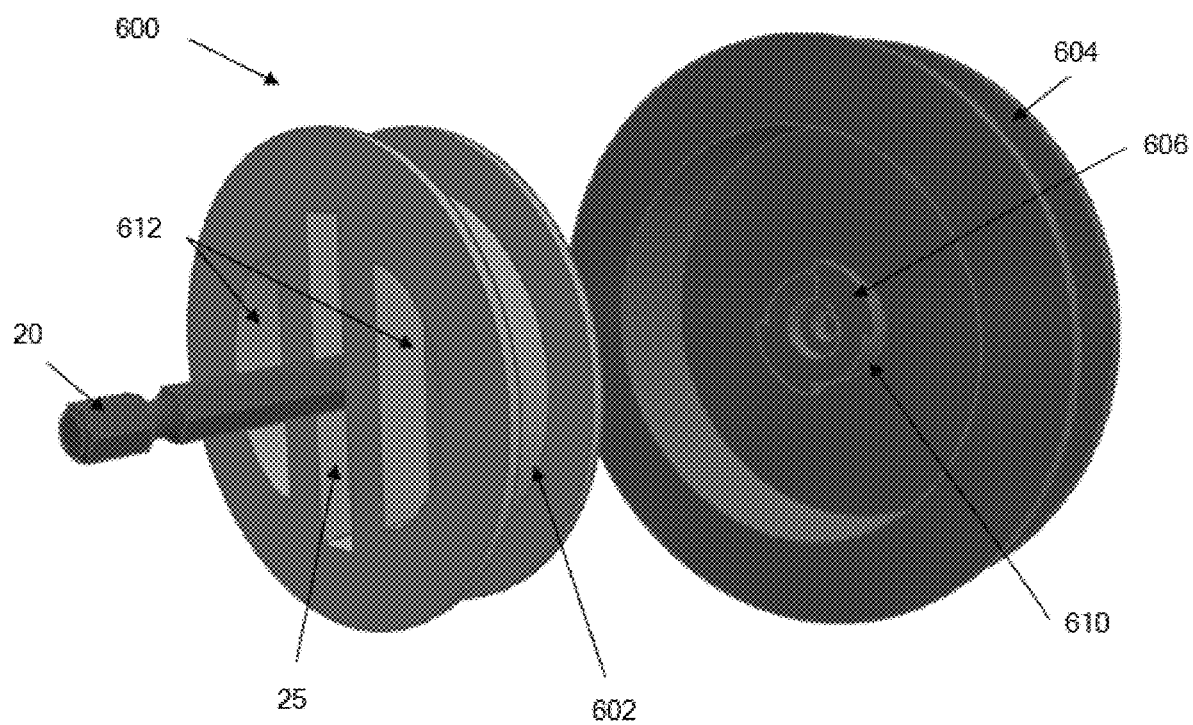
FIG. 6C is an isometric front-side view of the replacement fishing cartridge of FIG. 6B in the open position. The drive bit is inserted into a drive bit hole of the inner spooling portion.

FIG. 6C shows a front view of the drive bit 20 inserted into the drive bit hole (not shown) of the inner spooling portion 602. The drive bit 20 when inserted into the drive bit hole is configured to provide rotational movement to the replacement fishing line cartridge 600. For example, old fishing line may be rotated and wrapped around the inner spooling portion 602 when in the replacement fishing line cartridge 600 is in the open position or around the outer spooling portion 604 when the replacement fishing line cartridge 600 is in the closed position. To provide rotation, the drive bit 20 may be configured to attach to a machine such as, but not limited to, an electric motor or handheld electric drill to allow for machine powered winding and unwinding of the old and/or new fishing lines. Alternatively, the drive bit may be configured to attach to a crank or a handle to provide for manual rotation. It is to be understood that the drive bit 20, drive bit hole, drive bit material, drive bit machine, and storage slot 25 described above are merely illustrative and are not intended to confine the scope of the present disclosure.

Figure 6D:
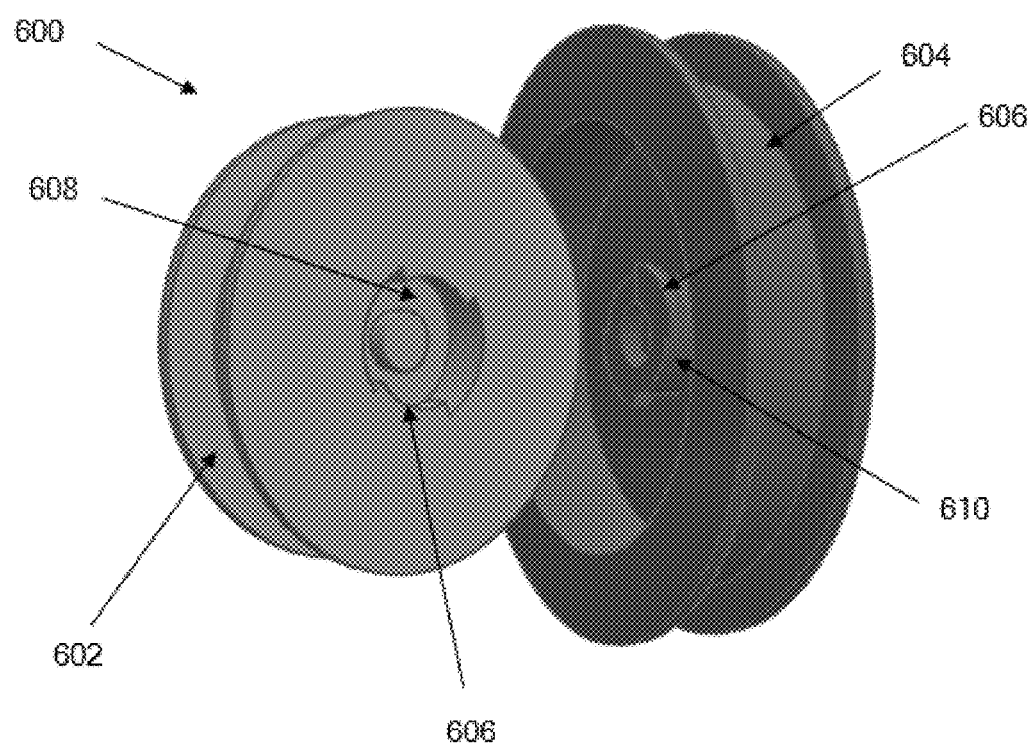

FIG. 6D shows a rear view of the inner spooling portion 602 removed from the outer spooling portion 604 in the open position.

Another aspect of the present disclosure is a method for replacing fishing line using the replacement fishing line cartridge (or fishing line holder) of FIGS. 1A through 6D. In particular, the method may comprise providing the fishing line cartridge 100, 200, 300, 400, 500, 600 of FIGS. 1A through 6D, wherein the fishing line cartridge may be in the closed position. The fishing line cartridge 100, 200, 300, 400, 500, 600 may include new fishing line previously wrapped around a spooling portion 102, 104, 202, 204, 302, 304, 402, 404, 502, 504, 602, or 604. The method may further comprise providing a fishing rod and/or reel having old fishing line that requires replacement. The method may include converting the replacement fishing line cartridge 100, 200, 300, 400, 500, 600 into the open position by either unsnapping, unlocking, sliding, or uncovering the respective spooling portion that does not include the new fishing line (the "empty spooling portion"). One end of the old fishing line may then be attached to the empty spooling portion via a means of securement. The method may next include removing the drive bit 20 from the storage slot 25, and inserting the drive bit 20 into the drive bit hole (not shown). The drive bit 20 may then be attached to a machine that provides for automated rotation, or alternatively, the drive bit 20 may be manually rotated. As the replacement fishing line cartridge 100, 200, 300, 400, 500, 600 is rotated via the drive bit 20, the old fishing line may be drawn from and removed from the fishing reel and wound around the empty spooling portion. After the old fishing line is removed from the fishing reel and wound around the previously empty spooling portion, the fishing line cartridge 100, 200, 300, 400, 500, 600 may be converted into the closed position by either snapping, locking, sliding, or covering the respective spooling portion that now includes the old fishing line. The closed position therefore is configured to store the old fishing line and prevent it from detangling.

Next the method may comprise attaching one end of the new fishing line on the replacement fishing line cartridge 100, 200, 300, 400, 500, 600 to the fishing reel via a means of securement. The new fishing line may then be unwound from its respective spooling portion as the new fishing line is drawn into the reel to replace the old fishing line. After the new fishing line is gone from the replacement fishing line cartridge 100, 200, 300, 400, 500, 600, the cartridge may be disposed of in its entirety and/or recycled. In this manner, the old fishing line remains wound around its respective spooling portion and stored in the replacement fishing line cartridge 100, 200, 300, 400, 500, 600 for convenience in disposal, to prevent detangling of the old fishing line, and to ensure the safety of the environment.

The replacement fishing line cartridge of FIGS. 1A through 6D and method of replacing fishing line may incorporate a means of securement to prevent the unravelling of the old fishing line and/or the new fishing line from sliding off of the inner, outer, first and/or second spooling portions. This means of securement may include a lip or a ridge on the spooling portions that are configured to prevent lateral movements of the fishing lines. The means of securement may also include attaching ends of the old and new fishing lines onto the replacement fishing line cartridge using, but not limited to, holes, snaps, clips, knots, notched edges, tape, elastomer bands, zip-ties, or other suitable techniques for attaching ends of fishing lines. It is contemplated that attaching ends of the old and new fishing lines to the replacement fishing line cartridge will facilitate with winding and unwinding of the old and new fishing lines. Additionally, it is contemplated that attaching the new and/or old fishing lines will prevent wildlife from becoming tangled after disposal of the replacement fishing line cartridge and to assist with recycling and disposal.

It is contemplated that the spooling portions of the replacement fishing line cartridge of the present disclosure may be removably attached. The removably attached spooling portions may be either inner and/or outer spooling portions. Alternatively, the removably attached spooling portions may be either first and/or second spooling portions. Any of the aforementioned spooling portions may be configured to hold old fishing line or new fishing line. It is understood that the removably attachable spooling portions may allow for reuse of the replacement fishing cartridge. It is also understood that the scope of the present disclosure is not limited to the inner, outer, first or second spooling portion geometries depicted in FIGS. 1A through 6D, which are provided merely for illustrative purposes. Rather, it is noted herein that the scope of the present disclosure may be extended to any spooling geometries configured for optimally winding or unwinding fishing line.

It is also contemplated that the replacement fishing line cartridge and method of replacing fishing line of the present disclosure may be designed to occupy dimensions similar to traditional new fishing line spools. It is further contemplated that maintaining similar dimensions to traditional new fishing line spools may allow for the replacement fishing line cartridge of the present disclosure to be more adaptable to currently utilized techniques, such as, but not limited to, line spooling techniques, spool thickness design, spool packaging techniques (e.g., blister packaging), and supply chain management considerations.

The replacement fishing line cartridge and method of replacing fishing line of the present disclosure are universally applicable to rods-and-reels of all, makes, models, sizes and manufacturers. Although the disclosure has been described and illustrated with respect to preferred aspects thereof, it is not to be so limited since changes and modifications may be made therein which are within the full intended scope of the disclosure.

What is claimed is:

1. A replacement fishing line cartridge, comprising:
    a first spooling portion for winding a first fishing line from a fishing reel onto the first spooling portion;
    the first spooling portion being an inner spooling portion;
    a second spooling portion for winding a second fishing line from the second spooling portion onto the reel;
    the second spooling portion being an outer spooling portion;
    the first spooling portion and the second spooling portion sharing a concentric axis;
    an open position for winding and unwinding fishing line from the inner spooling portion; and
    a closed position wherein the inner spooling portion is inaccessible for winding and unwinding fishing line.

2. The replacement fishing line cartridge of claim 1, wherein the inner spooling portion is detachably snapped into the outer spooling portion.

3. The replacement fishing line cartridge of claim 1, wherein the inner spooling portion is detachably slid into the outer spooling portion.

4. The replacement fishing line cartridge of claim 1, wherein the inner spooling portion is detachably locked into the outer spooling portion.

5. A replacement fishing line cartridge, comprising:
    a first spooling portion for winding a first fishing line from a fishing reel onto the first spooling portion;
    a second spooling portion for winding a second fishing line from the second spooling portion onto the reel;

the first spooling portion and the second spooling portion sharing a concentric axis;

a divider separating the first spooling portion and the second spooling portion; and the first spooling portion laterally offset from the second spooling portion by the divider;

wherein the divider comprises:
 a. a rigid divider that includes a sliding cover configured to cover either the first spooling portion or the second spooling portion; or
 b. a flexible divider configured to cover either the first spooling portion or the second spooling portion.

6. A replacement fishing line cartridge, comprising:
an outer spooling portion;
an inner spooling portion, the inner spooling portion comprising:
 a) a drive bit;
 b) a storage slot for removably storing the drive bit;
 c) a drive bit hole;
 d) the drive bit configured to be inserted into the drive bit hole;
 e) the drive bit when inserted into the drive bit hole configured to provide rotational movement to the replacement fishing line cartridge;
the outer spooling portion configured to hold a first fishing line;
the inner spooling portion configured to hold a second fishing line; and
the inner spooling portion configured to attach and detach inside an inner radius of the outer spooling portion.

7. The replacement fishing line cartridge of claim 6, further comprising:
an open position wherein the inner spooling portion is detached from the outer spooling portion; and
a closed position where the inner spooling portion is attached inside the outer spooling portion;
wherein in the closed position the inner spooling portion is configured to store fishing line inside the outer spooling portion to prevent detangling of the fishing line.

8. The replacement fishing line cartridge of claim 7, wherein rotational movement to the replacement fishing line cartridge is configured to wrap fishing line around the inner spooling portion when the replacement fishing line cartridge is in the open position or around the outer spooling portion when the replacement fishing line cartridge is in the closed position.

9. The replacement fishing line cartridge of claim 8, further comprising:
the drive bit attached to an electric drill;
the electric drill configured to provide the rotational movement to the replacement fishing line cartridge.

10. The replacement fishing line cartridge of claim 6, wherein the inner spooling portion is detachably snapped into the outer spooling portion.

11. The replacement fishing line cartridge of claim 10, wherein the inner spooling portion is detachably snapped into the outer spooling portion via a fastening device.

12. The replacement fishing line cartridge of claim 6, wherein the inner spooling portion is detachably locked into the outer spooling portion.

13. The replacement fishing line cartridge of claim 12, the inner spooling portion comprising:
a lock-in element;
a gripping portion;
the gripping portion configured to rotate the inner spooling portion to lock the inner spooling portion in-and-out of the outer spooling portion via the lock-in element.

14. A method of replacing fishing line, comprising:
providing a fishing rod and/or reel having old fishing line that requires replacement;
providing a replacement fishing line cartridge, comprising:
 a) an outer spooling portion;
 b) an inner spooling portion;
 c) a drive bit;
 d) a storage slot for removably storing the drive bit;
 e) a drive bit hole;
 f) the drive bit configured to be inserted into the drive bit hole;
 g) the drive bit when inserted into the drive bit hole configured to provide rotational movement to the replacement fishing line cartridge;
 h) the inner spooling portion configured to attach and detach inside an inner radius of the outer spooling portion;
 i) an open position wherein the inner spooling portion is detached from the outer spooling portion;
 j) a closed position where the inner spooling portion is attached inside the outer spooling portion;
providing new fishing line wrapped around the outer spooling portion of the replacement fishing line cartridge;
converting the replacement fishing line cartridge from the closed position to the open position;
attaching the old fishing line to the inner spooling portion;
removing the drive bit from the storage slot;
inserting the drive bit into the drive bit hole;
rotating the inner spooling portion via the drive bit, wherein as the inner spooling portion is rotated the old fishing line is removed from the fishing reel and wrapped around the inner spooling portion;
converting the replacement fishing line cartridge from the open position to the closed position after the old fishing line is removed from the fishing reel;
storing the old fishing line in the replacement fishing line cartridge to prevent the old fishing line from detangling;
attaching the new fishing line on the replacement fishing line cartridge to the fishing reel;
unwinding the new fishing line from the outer spooling portion as the new fishing line is added to the fishing reel to replace the old fishing line; and
disposing or recycling the replacement fishing line cartridge comprising the old fishing line.

15. The method of replacing fishing line of claim 14, further comprising:
attaching an electric drill to the drive bit; and
rotating the inner spooling portion via the drive bit using the electric drill.

16. The method of replacing fishing line of claim 14, wherein the inner spooling portion is detachably snapped into the outer spooling portion.

17. The method of replacing fishing line of claim 14, wherein the inner spooling portion is detachably locked into the outer spooling portion.

18. The method of replacing fishing line of claim 17, further comprising:
providing a lock-in element on the inner spooling portion;
providing a gripping portion on the inner spooling portion; and using the gripping portion to rotate the inner spooling portion to lock the inner spooling portion in-and-out of the outer spooling portion via the lock-in element.

* * * * *